United States Patent [19]

Kishida et al.

[11] 4,095,005

[45] June 13, 1978

[54] METHOD OF PRODUCING LOW WEAR COATING REINFORCED WITH BRAZING SOLDER FOR USE AS RUBBING SEAL

[75] Inventors: Katsuhiro Kishida; Akira Oyamada, both of Yokohama, Japan

[73] Assignee: Nissan Motor Company, Ltd., Japan

[21] Appl. No.: 713,264

[22] Filed: Aug. 10, 1976

[30] Foreign Application Priority Data

Aug. 18, 1975 Japan .................................. 50-99455

[51] Int. Cl.$^2$ ............................................. F01D 11/08
[52] U.S. Cl. ................................ 427/376 B; 427/377; 427/405; 427/419 A; 427/419 B; 427/423; 428/469; 415/170 R; 308/238
[58] Field of Search ............... 427/423, 376 B, 419 A, 427/419 B, 383 D, 34; 428/469, 472; 308/238, DIG. 8, DIG. 9; 415/170 R

[56] References Cited

U.S. PATENT DOCUMENTS 3,877,961  4/1975  Tank et al. ........................ 427/203 X
3,911,891  10/1975  Dowell ............................. 427/34 X

FOREIGN PATENT DOCUMENTS 1,108,354  4/1968  United Kingdom ................. 427/423

Primary Examiner—Ralph S. Kendall

[57] ABSTRACT

A low wear coating formed on a metal substrate to serve as a high temperature rubbing seal layer, comprising a surface layer made fundamentally of a wear resistant metal oxide such as nickel oxide and a solid lubricating material such as calcium fluoride and at least one intermediate layer made fundamentally of the metal oxide optionally with the addition of the lubricating material, wherein at least an outmost intermediate layer as well as an inmost region of the surface layer is impregnated with a brazing solder. The solder is added in the form of powder to the material of the intermediate layer prior to a flame spraying process and later caused to melt and permeate into the surface layer formed by flame spraying.

7 Claims, 3 Drawing Figures

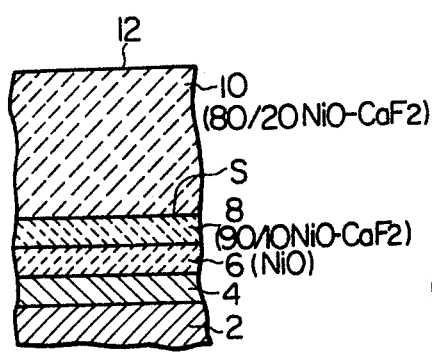
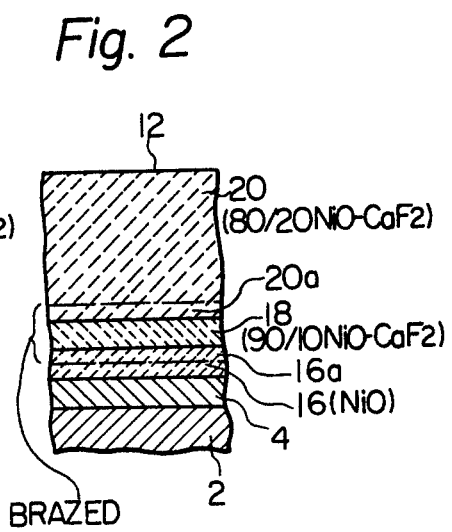
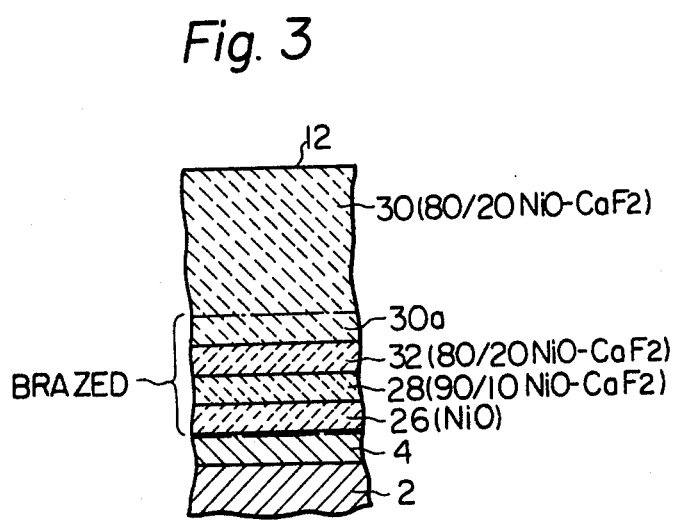

METHOD OF PRODUCING LOW WEAR COATING REINFORCED WITH BRAZING SOLDER FOR USE AS RUBBING SEAL

This invention relates to a ceramic coating formed on a surface of a metal substrate for providing a high temperature low wear rubbing contact face and a method of producing the same. The coating is particularly useful as a seal layer on a rotary regenerator in a gas turbine.

Gas turbine engines which use rotating disc-type regenerators usually employ rubbing contact seals on the end faces of the rotating discs. A typical seal member for such regenerators comprises a metal substrate and a laminated coating applied on a surface of the substrate to provide a surface layer having a low coefficient of friction and a low wear property when used with a regenerator material, which is usually a ceramic material, at high temperatures. A typical example of the substrate material is an austenitic stainless steel such as an AISI 304 stainless steel (18Cr-8Ni). The coating consists, for example, of a bonding layer of nickel aluminide formed on the substrate, a first undercoat or intermediate layer of nickel oxide (NiO) formed on the bonding layer, a second intermediate layer consisting of 90% nickel oxide as a matrix material and 10% calcium fluoride as a glazing or lubricating material, and a surface layer which is formed on the second intermediate layer and consists of 80% nickel oxide and 20% calcium fluoride. These four layers are applied individually by a flame spraying technique. The surface layer is usually about 0.5 mm thick while the bonding layer and intermediate layers are individually about 0.1 mm thick.

A seal member of this type has the disadvantage that the surface layer is liable to separate from the second intermediate layer when used at temperatures above about 700° C. The separation is fundamentally attributable to the fact that the materials of the coated layers have lower coefficients of thermal expansion than the substrate metal. In the above example, the material of the second intermediate layer has the lowest coefficient of thermal expansion, so that a greatest shear stress develops in this layer when the seal member is heated. The shear stress tends to exceed the bonding force of the second intermediate layer to the surface layer, resulting in the separation between the two layers, either when the seal member is alternately subjected to a rapid and considerable heating and a rapid cooling or when the seal member is simultaneously heated in a portion and cooled in the remaining portion. Such a separation phenomenon occurs whether the coating has two or more intermediate layers or it has only one intermediate layer.

Each layer of the above described coating has a porous structure resulting from the deposition and solidification of molten and flame sprayed droplets of the layer material. The bond between each layer and either the substrate or an underlayer is preserved merely by the cohesive force of the deposited layer material and hence is not very strong. Besides, the porous structure retains therein thermal strains developed during the flame spraying process and accordingly is fragile.

It is an object of the present invention to provide a high temperature low wear coating formed on a metal substrate to have a rubbing contact face, which coating has a greatly enhanced resistance to breakage by the exposure to high temperature atmospheres and/or repeated temperature change and is particularly useful as a rubbing contact seal layer on a rotary regenerator.

It is another object of the invention to provide a high temperature low wear coating which is formed on a metal substrate and includes a surface layer made fundamentally of a highly wear resistant metal oxide and a solid lubricating material and at least one intermediate layer of the same metal oxide optionally with the addition of the solid lubricating material interposed between the substrate and the surface layer, wherein each intermediate layer is firmly bonded to adjacent layers not merely by the cohesive force of the intermediate layer but by the aid of a brazing solder so that no separation between the intermediate layer and adjacent layers may occur even when the coating as well as the substrate is alternately heated to 800° C and cooled to room temperature.

It is still another object of the invention to provide a method of producing a high temperature low wear coating as described in the preceding objects of the invention.

A coating according to the invention comprises at least one intermediate layer, which is formed on a surface of a metal substrate and is made fundamentally of a wear resistant metal oxide optionally with the addition of a solid lubricating material, and a surface layer which is formed on the outmost intermediate layer to provide a rubbing contact face and is made fundamentally of the metal oxide and the solid lubricating material. Both the intermediate layer and the surface layer are microporous. Preferably, the coating may include a bonding layer of an alloy sandwiched between the substrate and an inmost intermediate layer. In these respects, the coating is of a known construction. The coating is characterized in that the outmost intermediate layer is impregnated with a brazing solder while the surface layer also is impregnated with the same brazing solder only in its inmost region adjacent the outmost intermediate layer so that the brazing solder fills in pores of the outmost intermediate layer and the inmost regions of the surface layer and strengthen the bond between these two layers.

Preferably, every intermediate layer is impregnated with a brazing solder to render the coating extremely tough.

A nickel-phosphorus solder is the most preferable as the brazing solder for the impregnation, but other brazing solders such as a copper base solder and a silver base solder are also useful. The respective materials of the surface layer, intermediate layers, bonding layer and the substrate can be selected on the same basis as in conventional rubbing seal members for rotary regenerators. Examples of useful wear resistant metal oxides are NiO and CoO. The solid lubricating material is preferably selected from fluorides of Group IIa metals such as $MgF_2$, $CaF_2$ and $BaF_2$, but may alternatively be selected from certain phosphates such as $Mg_2P_2O_7$ and $Ca_2P_2O_7$, borates typified by $CaB_4O_7$ and other compounds exemplified by PbO. Nickel aluminide is a preferred material of the bonding material. The metal substrate may be of steel, aluminum or magnesium, but is preferably an austenitic stainless steel such as an AISI 304 stainless steel because of its adequate coefficient of thermal expansion.

In the production of a coating according to the invention, the bonding layer (when employed), intermediate layers and surface layer are individually applied by a flame spraying technique as in the production of conventional seal rubbing members. The introduction of a brazing solder into the coating must be accomplished by the following procedure. A powdered brazing solder is mixed with a powdered material of each intermediate layer which is selected as to be impregnated with the brazing solder. The brazing solder is added preferably to amount to 10–50 Wt% of the resulting powder mixture. The resulting mixture is applied by flame spraying onto the precedingly formed layer which may be either the bonding layer or an intermediate layer. The surface layer is formed on the outmost intermediate layer without the addition of the brazing solder to its material. Then the entire coating formed on the substrate is heated to a temperature above the melting point of the brazing solder preferably under vacuum and is maintained at this temperature for a while in order to allow the molten solder to sink into an inmost region of the surface layer (also into an outmost region of another intermediate layer located beneath, if present). Then the temperature is lowered to room temperature to solidify the solder which has filled in the pores of the intermediate layer and the surface regions of the adjacent layers.

The intended effect of the brazing solder, i.e. a strong bonding at least between the outmost intermediate layer and the surface layer, can be secured only when the brazing solder is added to the material of the outmost intermediate layer prior to the spraying procedure. If the outmost intermediate layer is formed without the use of the brazing solder and instead a brazing solder layer is formed between the intermediate layer and the surface layer, a complete separation between the intermediate layer and the surface layer tends to occur upon a subsequent heating for melting the solder and causing the permeation of the solder into the two layers.

The invention will fully be understood from the following detailed description of preferred embodiments with reference to the accompanying drawings, wherein:

FIG. 1 is an enlarged cross-sectional view of a conventional rubbing contact seal layer;

FIG. 2 is an enlarged cross-sectional view of a rubbing contact seal layer as a preferred embodiment of the invention with fundamentally the same components as the seal layer of FIG. 1; and FIG. 3 is a similar view of a different seal layer as a modification of the seal layer of FIG. 2.

FIG. 1 shows the construction of the exemplary conventional seal member described hereinbefore. This seal layer was used in Examples presented hereinafter as a standard of comparison. The substrate 2 was of a 304 stainless steel, and the bonding layer 4 was formed by flame spraying a 96% Ni-4% Al nickel aluminide onto the surface of the substrate 2 to the thickness of 0.1 mm. The first intermediate layer 6 was formed by flame spraying powdered NiO into the bonding layer to the thickness of 0.1 mm. The second intermediate layer 8 also was formed by flame spraying and was 0.1 mm thick. The material of this layer 8 was a powder mixture of 90 Wt% NiO and 10 Wt% $CaF_2$. The surface layer 10, which provides a rubbing contact face 12, was formed by flame spraying a powder mixture of 80 Wt% NiO and 20 Wt% $CaF_2$ onto the second intermediate layer 8 to the thickness of 0.5 mm. As explained hereinbefore, separation tends to occur in this seal layer particularly at the interface S between the surface layer 10 and the second or outmost intermediate layer 8.

EXAMPLE 1

A low wear coating according to the invention was produced in this example in the form of a modification of the prior art seal layer of FIG. 1 by impregnating part of the coating of FIG. 1 with a nickel brazing solder.

Referring to FIG. 2, the bonding layer 4 was formed by flame spraying nickel aluminide (96% Ni-4% Al) to 0.1 mm thick onto the 304 stainless steel substrate 2. Then powdered NiO was flame sprayed onto the bonding layer 4 to form a 0.1 mm thick first intermediate layer 16. At this stage, not only the bonding layer 4 but also the intermediate layer 16 were identical with the corresponding layers 4 and 6 of the coating of FIG. 1. To form a second intermediate layer 18, 20 parts by weight of a nickel-phosphorus brazing solder (which consisted of 89% Ni and 11% P and had an excellent liquidity when molten) in the form of a fine powder having a mean particle size of about 10 μm was mixed with 80 parts by weight of the powdered material used for producing the second intermediate layer 8 in FIG. 1 (a mixture of 90 Wt% NiO and 10 Wt% $CaF_2$). Accordingly, the resulting powder mixture contained 72% NiO, 8% $CaF_2$ and 20% nickel solder. This mixture was applied onto the first intermediate layer 16 to 0.1 mm thick by flame spraying. Then the powder of 80 Wt% NiO-20 Wt% $CaF_2$ was flame sprayed onto the second intermediate layer 18 to form a 0.5 mm thick surface layer 20 similarly to the surface layer 10 in FIG. 1. The thus coated substrate 2 was heated to 980° C and kept for 5 min at this temperature under a vacuum of $10^{-5}$ Torr in order to allow the nickel solder in the second intermediate layer 18 to melt and permeate into both an inmost region 20a of the surface layer 20 and an outmost region 16a of the first intermediate layer 16.

The thus produced rubbing contact seal member (a combination of the substrate 2 and the coating) of FIG. 2 was subjected to a heat shock test which was a repetition of a rapid heating to 800° C and a rapid cooling to room temperature. No separation of the second intermediate layer 18 either from the surface layer 20 or the first intermediate layer 16 occurred even when the cycle of the heating and cooling was repeated ten times. When the seal member of FIG. 1 was subjected to the same test, separation between the second intermediate layer 8 and the surface layer 10 occurred upon completion of only one cycle of the heating and cooling.

It was revealed by microscopic observation and X-ray analysis of the coating of FIG. 2 that the outmost region 16a of the first intermediate layer 16 and the inmost region 20a of the surface layer 20 were well impregnated with the nickel solder and were respectively about 0.05 mm thick. The nickel solder almost completely filled in the pores of the second intermediate layer 18 and the two adjacent surface regions 16a and 20a. The nickel solder in the coating of FIG. 2 had a three-dimensional metallic network structure.

Example 1 was repeated by varying the amount of the nickel solder in the powder mixture for producing the second intermediate layer 18 to 10, 30, 40, 50, 60, 70 Wt%. The respective products were subjected to the above described heat shock test, but any separation of the second intermediate layer 18 from the adjacent layers 16 and 20 was observed on none of these products. The pores in the vicinity of the interfaces between the second intermediate layer 18 and the adjacent layers 16 and 20 were completely filled in with the nickel solder when the amount of the solder was 30% or more. When the amount of the solder was either 80% or 90%, the solder permeated through the total thickness of the surface layer 20 and reached the rubbing contact face 12, so that the surface layer 20 became less resistant to wear.

EXAMPLE 2

This example was different from Example 1 only in that the material of the second intermediate layer 18 was a powder mixture of 20 Wt% of a copper solder (87% Cu, 10% Mn and 3% C) and 80 Wt% of the 90/10 NiO-CaF$_2$ and that the brazing under vacuum was carried out at 1020° C for 5 min. The second intermediate layer 18 of this example did not separate from the adjacent layers 16 and 20 when the seal member was subjected to ten cycles of the heating to 800° C and cooling to room temperature. However, it was observed that the copper solder was inferior to the nickel solder of Example 1 in the liquidity or the ability of uniformly permeating into the adjacent porous layers 16 and 20. The copper solder should be used in a larger quantity than the nickel solder of Example 1 or alternatively be added not only to the second intermediate layer 18 but also to the adjacent layers 16 and 20 as will hereinafter be illustrated in Example 4.

EXAMPLE 3

This example was different from Examples 1 and 2 only in that the material of the second intermediate layer 18 was a powder mixture of 30 Wt% of a silver solder (52% Ag, 15% Cu, 14% Zn, 16% Cd and 3% Ni) and 70 Wt% of the 90/10 NiO-CaF$_2$ and that the brazing under vacuum was carried out at 950° C for 5 min. The result of the heat shock test was the same as that in Example 1. However, the permeation of the solder into the adjacent layers 16 and 20 was less uniform and to a less extent than the case of 30% nickel solder in Example 1.

As demonstrated by the foregoing examples, a coating which serves as a rubbing contact seal layer and is reliably operable at high temperatures at least up to 800° C can be obtained by partly impregnating the coating with a brazing solder which may be a nickel solder, copper solder or silver solder. However, a nickel solder is most preferred because of its high ability of filling micropores of the coating, uniformly spreading and far permeating. A nickel solder is advantageous also from a different point of view. A brazing solder in a coating according to the invention may partly be oxidized when the coating is used as a seal layer in a high temperature atmosphere. In the case of a nickel solder, the oxidation of the solder gives NiO which is a preferred wear resistant material of the coating.

In the preparation of a powder mixture of a brazing solder and a fundamental material (e.g., a NiO-CaF$_2$ system) of an intermediate layer, the amount of the solder is determined also taking into consideration the degree of the porosity of the intermediate layer and the adjacent layers before melting of the solder and is preferably in the range from about 10 to about 50 Wt% of the resulting powder mixture. The pores in the surface regions 16a and 20a cannot well be filled with the solder if the amount of the solder in the intermediate layer is too small. If the solder is used in an excessively large amount, the surface layer 20 suffers a lowered wear resistance as illustrated in Example 1.

In Examples 1–3, a brazing solder was added only to the second intermediate layer 18. However, a still more tough coating can be produced by adding a brazing solder to every intermediate layer 16, 18 at the flame spraying stage of the production process. Besides, the surface layer 20 may be formed by the three steps of firstly forming a relatively thin inmost part from a mixture of the solder and the fundamental material of the surface layer, then forming the remaining part from the fundamental material alone and finally fusing together these two parts by melting the solder. When every layer of the coating is individually formed by flame spraying a solder-containing material and thereafter fused together by a brazing process, the resulting coating includes a three-dimensional metallic network structure or skeleton over the entire region between the surface layer 20 and the bonding layer 4. Accordingly the coating is extremely resistant to breakage by heat shocks such as separation between two adjacent layers even when all the layers have different coefficients of thermal expansion. It is possible, therefore, to increase the thickness of the surface layer 20 and prolong the service life of the coating as a rubbing contact seal layer without causing a lowering of the toughness of the coating.

EXAMPLE 4

A product of this example is shown in FIG. 3. The 304 stainless steel substrate 2 and the nickel aluminide bonding layer 4 were identical with the ones in Examples 1–3.

A 0.1 mm thick first intermediate layer 26 was formed by flame spraying a powder mixture of 30 Wt% of the nickel solder used in Example 1 and 70 Wt% of NiO. A 0.1 mm thick second intermediate layer 28 was formed by flame spraying a powder mixture of 30 Wt% of the same nickel solder and 70 Wt% of the 90/10 NiO-CaF$_2$. (Accordingly, this powder mixture contained 63% Nio, 7% CaF$_2$ and 30% nickel solder.) Then another 0.1 mm thick layer 32 was formed on the second intermediate layer 28 by flame spraying a powder mixture of 30 Wt% of the same nickel solder and 70 Wt% of the 80/20 NiO-CaF$_2$. (This powder mixture contained 56% NiO, 14% CaF$_2$ and 30% nickel solder.) Then a 0.6 mm thick surface layer 30 was formed on this layer 32 by flame spraying a powder of the 80/20 NiO-CaF$_2$. The resulting seal member or the combination of the substrate 2 and the coating was heated to 980° C and kept at this temperature for 5 min under a vacuum of $10^{-5}$ Torr to allow the nickel solder in the three layers 26, 28 and 32 to melt and sink into adjacent layers.

It was confirmed that an inmost region 30a of the surface layer 30, which had a thickness of 0.1 mm from the interface between the layer 32, was well impregnated with the nickel solder exuded from the layer 32. The surface of the bonding layer 4 was wetted with the nickel solder and fused to the first intermediate layer 26. Thus a nickel solder network extended in the coating produced in this example over a thickness of about 0.4 mm and firmly supported the surface layer 30 of a relatively large thickness. None of these layers in the coating of this example separated from a layer located beneath when the seal member was subjected to ten cycles of a rapid heating to 800° C and a rapid cooling to room temperature.

What is claimed is:
1. A method of producing a low wear coating useful as a high temperature rubbing contact seal layer on a metal substrate, the method comprising the steps of:
  forming at least one intermediate layer on said substrate by individually flame spraying a powdered material containing at least a major amount of a wear resistant metal oxide selected from the group consisting of NiO and CoO optionally with the addition of a minor amount of a solid lubricating material selected from the group consisting of $MgF_2$, $CaF_2$, $BaF_2$, $Mg_2P_2O_7$, $Ca_2P_2O_7$, $CaB_4O_7$ and PbO, said powdered material used for at least an outmost one of said at least one intermediate layer containing from 10 to 50 Wt% of a powder of a brazing solder selected from the group consisting of a nickel base solder, a copper base solder and a silver base solder;

forming a surface layer on said outmost intermediate layer by flame spraying a powdered material consisting of a major amount of said metal oxide and a minor amount of said lubricating material; and thereafter heating said substrate with said at least one intermediate layer and said surface layer thereon to a temperature about the melting point of said brazing solder thereby to cause said brazing solder to melt and partially permeate into an inmost region of said surface layer.

2. A method as claimed in claim 1, wherein the heating step is carried out under vacuum.

3. A method as claimed in claim 1, wherein said brazing solder is a nickel-phosphorus solder.

4. A method as claimed in claim 1, further comprising the step of forming a bonding layer of an alloy on said substrate prior to the step of forming said at least one intermediate layer.

5. A method as claimed in claim 1, wherein at least two intermediate layers are formed at the firstly stated step, said powdered material for all of said at least two intermediate layers containing from 10 to 50 Wt% of said brazing solder.

6. A method as claimed in claim 1, wherein said surface layer is formed to have a larger thickness than any of said at least one intermediate layers, all said at least one intermediate layers being substantially of the same thickness.

7. A method as claimed in claim 6, wherein said temperature at the heating step is maintained for such a period of time that the thickness of said inmost region of said surface layer becomes from about 50 to about 100% of the thickness of said outmost intermediate layer.

* * * * *